(12) United States Patent
Holmes et al.

(10) Patent No.: US 7,644,854 B1
(45) Date of Patent: Jan. 12, 2010

(54) BEAD PACK BRAZING WITH ENERGETICS

(75) Inventors: Kevin C. Holmes, Houston, TX (US); Robert S. O'Brien, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/174,442

(22) Filed: Jul. 16, 2008

(51) Int. Cl.
*B23K 31/02* (2006.01)

(52) U.S. Cl. .................... 228/234.3; 228/246

(58) Field of Classification Search ........... None
See application file for complete search history.

(56) References Cited

U.S. PATENT DOCUMENTS

| | | | |
|---|---|---|---|
| 5,538,795 | A | 7/1996 | Barbee, Jr. et al. |
| 5,547,715 | A | 8/1996 | Barbee, Jr. et al. |
| 5,968,428 | A * | 10/1999 | Kuwabara ............ 264/86 |
| 6,096,111 | A * | 8/2000 | Polese et al. ............ 75/228 |
| 6,263,972 | B1 | 7/2001 | Richard et al. |
| 6,305,468 | B1 | 10/2001 | Broome et al. |
| 6,534,194 | B2 | 3/2003 | Weihs et al. |
| 6,596,101 | B2 | 7/2003 | Weihs et al. |
| 6,607,032 | B2 | 8/2003 | Voll et al. |
| 6,736,942 | B2 | 5/2004 | Weihs et al. |
| 6,863,992 | B2 | 3/2005 | Weihs et al. |
| 6,991,855 | B2 | 1/2006 | Weihs et al. |
| 6,991,856 | B2 | 1/2006 | Weihs et al. |
| 7,121,402 | B2 | 10/2006 | Van Heerden et al. |
| 7,143,568 | B2 | 12/2006 | Van Heerden et al. |
| 7,297,626 | B1 | 11/2007 | Cole et al. |
| 7,316,273 | B2 * | 1/2008 | Nguyen ............ 166/279 |
| 7,318,481 | B2 | 1/2008 | Richard |

(Continued)

FOREIGN PATENT DOCUMENTS

WO   WO99/38725   *   8/1999

OTHER PUBLICATIONS

Gauglitz, P.A., et al., "Foam Generation in Porous Media", SPE 75177, Apr. 2002, 1-15.
Broseta, D., et al., "Polymer Adsorption/Retention in Porous Media: Effect of Core Wettability and Residual Oil", SPE 24149, SPE Advanced Technology Series, vol, 3, No. 1, 1995, 103-112.

(Continued)

*Primary Examiner*—Kiley Stoner
(74) *Attorney, Agent, or Firm*—Steve Rosenblatt

(57) ABSTRACT

A method of making porous shapes from unit structures such as beads involves coating the beads with two or more layers of material deposited such that it forms an energetic material. These bi-layer energetic materials are formed from a variety of materials including, but not limited to: Ti & B, Zr & B, Hf & B, Ti & C, Zr & C, Hf & C, Ti & Si, Zr & Si, Nb & Si, Ni & Al, Zr & Al, or Pd & Al, all of which can be deposited from vapor. Pressure is applied to prevent the components from moving and the solid-state reaction between the alternating layers produces exothermic heat. Heat from the reaction alone or in conjunction of an applied brazing compound joins the beads forming a porous shape that is desired. The reaction in the materials may be activated with a small pulse of local energy that can be applied using optical, electrical, or thermal sources. Common examples include an electrical pulse, spark, hot filament, a laser beam, etc. The method reduces energy consumption and the need for specialized equipment. The reactive materials and optional brazing material are preferably applied in a fluidized CVD furnace.

20 Claims, 1 Drawing Sheet

U.S. PATENT DOCUMENTS

| | | |
|---|---|---|
| 7,361,412 B2 | 4/2008 | Wang et al. |
| 2005/0051607 A1* | 3/2005 | Wang et al. .................. 228/246 |
| 2005/0142495 A1* | 6/2005 | Van Heerden et al. ....... 430/311 |
| 2007/0018774 A1* | 1/2007 | Dietsch et al. .............. 337/159 |
| 2007/0267595 A1* | 11/2007 | Dodo .......................... 252/67 |

OTHER PUBLICATIONS

Reactive NanoTechnologies, NanoFoil webpage; www.rntfoil.com, 1 page.

* cited by examiner

BEAD PACK BRAZING WITH ENERGETICS

FIELD OF THE INVENTION

The field of this invention relates to methods of manufacturing porous aggregate shapes using unit structures that are attached to each other.

BACKGROUND OF THE INVENTION

Porous shapes are used in a variety of downhole applications such as for sand control in screens. Such screens are called prepacked screens because they are provided with such porous shapes integrated into a screen assembly. In some cases the presence of the porous material is a substitute for gravel packing the screens downhole. The porous shapes generally involve unitary shapes such as beads to be joined together to form a desired shape.

The way these shapes were made on the past was to coat the beads with a brazing material and feel the beads into a container that represents the desired aggregate shape. That assembly was in turn put into a vacuum furnace and heated while under mechanical compression. This process required specialized equipment and high energy consumption. Accordingly a different process was sought to reduce the cost of manufacturing the porous shapes and that lead to the present invention.

The new method features doing away with the vacuum furnace and replacing that operation with a different way to join the beads or other units into a desired shape. The method focuses on applying nano-layers of material preferably in a fluidized bed CVD furnace. Optionally a brazing material can also be added and the beads or other shapes can be put into a desired final overall shape with sufficient heat added to start the nano-material reacting and creating an exothermic reaction that either alone is sufficient to bond the unit shapes together or, with the aid of the brazing material, accomplishes joining of the unit shapes into a cohesive whole of a desired shape. The process is considerably cheaper to execute from an energy, manpower and specialized equipment cost perspective.

Nano-engineered materials are known as for example NanoFoil® made by Reactive NanoTechnologies of Hunt Valley, Md.; www.rntfoil.com. Once such a material is applied to an object a heat source starts a reaction that is exothermic in the nano-engineered material and the heat generated can be employed to do other things as described in the above mentioned web site.

The following patents are relevant to the discovery and development of the nano-engineered material that is preferred for use in the present invention.

| U.S. PAT. NO. | Title |
|---|---|
| 1 | 7,361,412 Nanostructured soldered or brazed joints made with reactive multilayer foils |
| 2 | 7,297,626 Process for nickel silicide Ohmic contacts to n-SiC |
| 3 | 7,143,568 Hermetically sealing a container with crushable material and reactive multilayer material |
| 4 | 7,121,402 Container hermetically sealed with crushable material and reactive multilayer material |
| 5 | 6,991,856 Methods of making and using freestanding reactive multilayer foils |
| 6 | 6,991,855 Reactive multilayer foil with conductive and non-conductive final products |
| 7 | 6,863,992 Composite reactive multilayer foil |
| 8 | 6,736,942 Freestanding reactive multilayer foils |
| 9 | 6,596,101 High performance nanostructured materials and methods of making the same |
| 10 | 6,534,194 Method of making reactive multilayer foil and resulting product |
| 11 | 5,547,715 Method for fabricating an ignitable heterogeneous stratified metal structure |
| 12 | 5,538,795 Ignitable heterogeneous stratified structure for the propagation of an internal exothermic chemical reaction along an expanding wavefront and method of making same |

These and other aspects of the present invention will become more apparent to those skilled in the art from a review of the detailed description of the preferred embodiment and the associated drawings that appear below while recognizing that the full scope of the invention is to be determined by the appended claims.

SUMMARY OF THE INVENTION

A method of making porous shapes from unit structures such as beads involves coating the beads with two or more layers of material deposited such that it forms an energetic material. These bi-layer energetic materials are formed from a variety of materials including, but not limited to: Ti & B, Zr & B, Hf & B, Ti & C, Zr & C, Hf & C, Ti & Si, Zr & Si, Nb & Si, Ni & Al, Zr & Al, or Pd & Al, all of which can be deposited from vapor. Pressure is applied to prevent the components from moving and the solid-state reaction between the alternating layers produces exothermic heat. Heat from the reaction alone or in conjunction of an applied brazing compound joins the beads forming a porous shape that is desired. The reaction in the materials may be activated with a small pulse of local energy that can be applied using optical, electrical, or thermal sources. Common examples include an electrical pulse, spark, hot filament, a laser beam, etc. The method reduces energy consumption and the need for specialized equipment. The reactive materials and optional brazing material are preferably applied in a fluidized CVD furnace.

DETAILED DESCRIPTION OF THE PREFERRED EMBODIMENT

Figure 1:
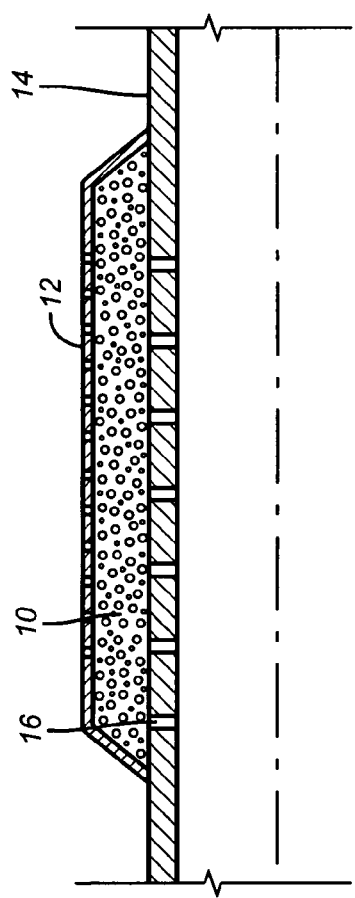
FIG. 1 is a section view of a cylindrical shape of porous material made by the method of the present invention for use as a pre-pack for screens.

A method of making porous shapes from unit structures such as beads involves coating the beads with two or more layers of material deposited such that it forms an energetic material. These bi-layer energetic materials are formed from a variety of materials including, but not limited to: Ti & B, Zr & B, Hf & B, Ti & C, Zr & C, Hf & C, Ti & Si, Zr & Si, Nb & Si, Ni & Al, Zr & Al, or Pd & Al, all of which can be deposited from vapor. Pressure is applied to prevent the components from moving and the solid-state reaction between the alternating layers produces exothermic heat. Heat from the reaction alone or in conjunction of an applied brazing compound joins the beads forming a porous shape that is desired. In the case of the present invention the combination of the material with objects such as beads generally made of a metallic or other fusible material allows the exothermic reaction that ensues to join or fuse the beads which can be spherical or other regular or irregular shapes into a predetermined larger shape such as an annular cylinder shape 10 shown in FIG. 1. This shape 10 can be a pre pack for a screen 12 on a base pipe 14 that has a series of holes 16.

Figure 2:
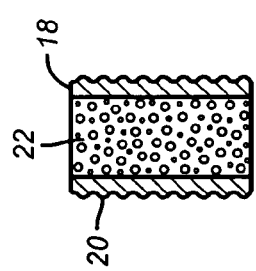
FIG. 2 is another cylindrical shape used in a threaded plug to screw into a threaded hole in a tubular made with the method of the present invention.

FIG. 2 shows an insert 18 with exterior threads 20 and a cylindrical filler 22 that is porous and made with the method of the present invention. The beads or other shapes that make the overall larger shape 22 are attached or fused together by the heat generated from applying a heat source to them while holding them in a desired final shape in this case a cylinder. Optionally a bonding agent activated by heat can be used with the foil to enhance or create the joining force for the unit shapes such as beads. The bonding agent can be a soldering or brazing compound and can be applied to the beads at the same time or at a different time than the foil. Preferably the beads or other shapes can have the foil applied to them in a chemical vapor deposition furnace. The foil material undergoes a solid state transformable reaction such as Al—Ni which can be structured to transform to a nickel-aluminide easily with a modest initiation energy source. This solid state transformation gives off substantial heat and doesn't require or produce oxygen or other consumables other than the two materials.

While the material that creates the exothermic reaction with low energy input for joining objects is not new, the method of joining beads or other shapes into larger shapes for downhole applications is new and presents a marked improvement over current manufacturing techniques. The energy input of the present method is greatly reduced from the prior technique, as well as time required. The specialized equipment for brazing in a vacuum environment under high temperature conditions is not required. As a result desired porous shapes can be made using the film applied preferably in a chemical vapor deposition process and optionally adding a joining material responsive to the heat generated when the film is initiated to react with an energy input source.

Figure 3:
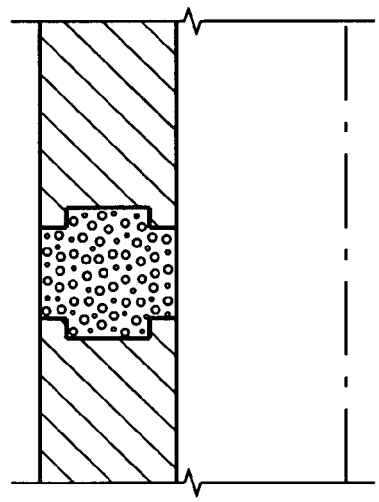
FIG. 3 is a section view with an opening in a wall of a tubular into which the beads are adhered to each other using the method of the present invention in a manner so that the finished shape will be retained in the tubular wall.

While porous shapes are contemplates in the preferred embodiment, the resulting shapes could also be impervious and have structural characteristics. The formed in place shapes such as in FIG. 3 can also be shaped so that they stay in place due to engagement of exterior irregularities with a surrounding structure, such as a tubular. The components joined by the process can be a structural shape that does not depend on an adjacent structure for strength to accomplish its function. In the porous mode, the formed shape can serve as a screen in and of itself or in conjunction with adjacent structures.

The above description is illustrative of the preferred embodiment and many modifications may be made by those skilled in the art without departing from the invention whose scope is to be determined from the literal and equivalent scope of the claims below.

We claim:

1. A method of making a porous shape assembly for downhole use, comprising:
   coating a plurality of components with a material that responds to an energy input with an exothermic reaction;
   holding said components in a predetermined shape;
   applying an energy input to said components to initiate an exothermic reaction in said material; and
   using the heat from said reaction to join the components together in said predetermined shape;
   associating said predetermined shape with an opening in a tubular wall to serve as a screen.

2. The method of claim 1, comprising:
   leaving passages through said predetermined shape.

3. The method of claim 1, comprising:
   using a brazing or soldering material in addition to the material that responds to energy input with an exothermic reaction.

4. The method of claim 1, comprising:
   using a nano-engineered film as the material that responds to energy input with an exothermic reaction.

5. The method of claim 4, comprising:
   using a film comprising Ti & B, Zr & B, Hf & B, Ti & C, Zr & C, Hf & C, Ti & Si, Zr & Si, Nb & Si, Ni & Al, Zr & Al, or Pd & Al.

6. The method of claim 1, comprising:
   connecting said predetermined shape to a housing where said predetermined shape can serve as at least a component of a screen.

7. The method of claim 6, comprising:
   positioning said predetermined shape to serve exclusively as the screen.

8. A method of making a porous shape assembly for downhole use, comprising:
   coating a plurality of components with a material that responds to an energy input with an exothermic reaction;
   holding said components in a predetermined shape;
   applying an energy input to said components to initiate an exothermic reaction in said material; and
   using the heat from said reaction to join the components together in said predetermined shape;
   connecting said predetermined shape to a housing where said predetermined shape can serve as at least a component of a screen;
   forming said predetermined shape into an opening in a tubular wall.

9. The method of claim 8, comprising:
   shaping said opening in said tubular wall to retain said predetermined shape.

10. A method of making a porous shape assembly for downhole use, comprising:
    coating a plurality of components with a material that responds to an energy input with an exothermic reaction;
    holding said components in a predetermined shape;
    applying an energy input to said components to initiate an exothermic reaction in said material; and
    using the heat from said reaction to join the components together in said predetermined shape;
    connecting said predetermined shape to a housing where said predetermined shape can serve as at least a component of a screen;
    forming said shape within a threaded nipple:
    threading said nipple into a threaded opening in a tubular.

11. The method of claim 1, comprising:
    said components are metallic.

12. The method of claim 11, comprising:
    said components are fused together from said exothermic reaction.

13. The method of claim 11, comprising:
    said components are joined together with a brazing or soldering material exposed to the heat of said exothermic reaction.

14. The method of claim 1, comprising:
applying said material that responds to energy input to said components with an exothermic reaction by a chemical vapor deposition process.

15. The method of claim 14, comprising:
applying a brazing or soldering material to said components by a chemical vapor deposition process.

16. The method of claim 14, comprising:
using a nano-engineered film further comprising aluminum and nickel as the material that responds to energy input with an exothermic reaction.

17. The method of claim 16, comprising:
connecting said predetermined shape to a housing where said predetermined shape can serve as at least a component of a screen.

18. The method of claim 16, comprising:
positioning said predetermined shape to serve exclusively as the screen.

19. A method of making a porous shape assembly for downhole use, comprising:
coating a plurality of components with a material that responds to an energy input with an exothermic reaction;
holding said components in a predetermined shape;
applying an energy input to said components to initiate an exothermic reaction in said material; and
using the heat from said reaction to join the components together in said predetermined shape;
applying said material that responds to energy input to said components with an exothermic reaction by a chemical vapor deposition process;
using a nano-engineered film further comprising aluminum and nickel as the material that responds to energy input with an exothermic reaction;
forming said predetermined shape into an opening in a tubular wall.

20. A method of making a porous shape assembly for downhole use, comprising:
coating a plurality of components with a material that responds to an energy input with an exothermic reaction;
holding said components in a predetermined shape;
applying an energy input to said components to initiate an exothermic reaction in said material; and
using the heat from said reaction to join the components together in said predetermined shape;
applying said material that responds to energy input to said components with an exothermic reaction by a chemical vapor deposition process;
using a nano-engineered film further comprising aluminum and nickel as the material that responds to energy input with an exothermic reaction;
shaping said opening in said tubular wall to retain said predetermined shape.

* * * * *